Patented June 23, 1931

1,811,305

UNITED STATES PATENT OFFICE

RENÉ ALEXANDRE ARTHUR COUZINET, OF LEVALLOIS-PERRET, FRANCE

CONTROL MEMBERS OF AN AIRPLANE

Original application filed February 15, 1928, Serial No. 254,558, and in France February 26, 1927. Divided and this application filed September 15, 1930. Serial No. 482,068.

The present invention relates to improvements in the control members of an airplane and particularly to the rudder bar. These improvements have for main object, in the case, either of the stoppage of a side engine for an airplane having several engines, or of an important drift, to hold the rudder bar in its position of rest, so as to avoid an exaggerated fatigue of the pilot who must ensure the steering of the airplane in these defective conditions.

These improvements are mainly characterized by the following points applied separately or in combination:

(a) the rudder is controlled by a device comprising two rudder bars rendered integral with each other by means allowing a relative angular displacement of the rudder bars; one of these rudder bars is directly actuated by the pilot and the other rudder bar, which is controlled by the preceding one, is connected to the rudder levers of the rudder.

(b) the foot-rests of the rudder bar are pivoted on the latter about axes preferably vertically arranged.

The accompanying drawings illustrate, by way of example only, a form of construction of an improved rudder bar in accordance with the invention.

Figure 1:
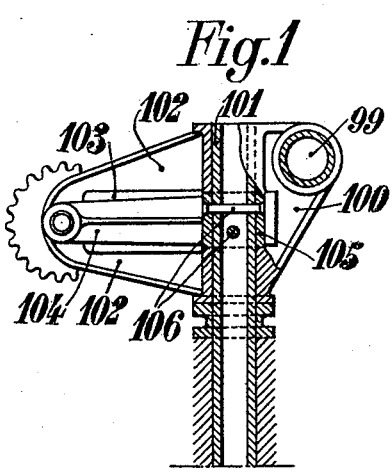
Figure 1 is an axial section of the adjustable double rudder bar.
Figure 3:
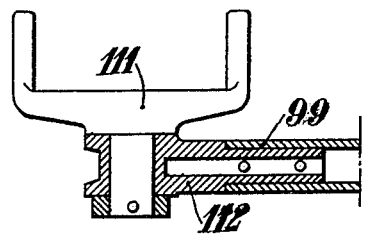
Figure 3 is an axial section of the assemblage of a foot-rest on the rudder bar.
Figure 2:
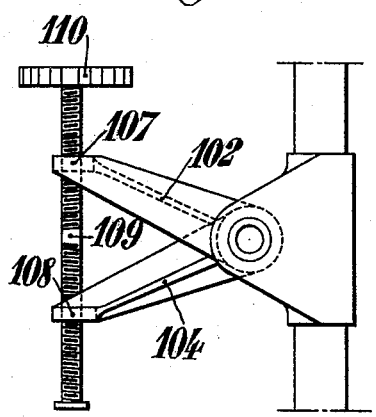
Figure 2 is a corresponding plan view.
Figure 4:
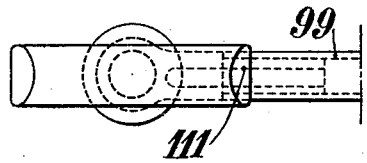
Figure 4 is a corresponding plan view.

The steering of the machine is ensured, in the example described and illustrated, by the device comprising two rudder bars. The upper rudder bar 99, which is the only one shown, is actuated by the pilot. The other rudder bar (not shown in the drawings) is connected to the king-posts of the rudder.

The angular connection between these two rudder bars is obtained by an adjustable device allowing to vary the angular position of the rudder bars relatively to each other. For that purpose, the rudder bar 99, which is rigid with a forkshaped member 100, is pivoted on a tube 101 on which is rigidly secured the rudder bar controlling the king-posts of the rudder. The fork 100 is provided with a ribbed arm 102 recessed at 103 in its central region. Another ribbed arm 104 which can enter the recess 103 is rigid with a sheath 105 secured, for instance by rivets 106, on the tube 101. Internally screw-threaded holes 107 and 108 are provided at the ends of the arms 102 and 104. A right handed and left handed screw 109, entering the holes 107 and 108, renders the arms 102 and 104, angularly rigid together, the arm 102 being in its turn rigid with the rudder bar 99 and the arm 104 being rigid with the operating tube of the other rudder bar. The angular position of both rudder bars relatively to each other is determined by the position of the screw 109 which is provided with an operating knob. The screw 109 might be screwed in small pulleys pivoted in the ends of the arms 102 and 104. This adjusting device allows, in case of stoppage of one of the side engines, to bring the rudder bar actuated by the pilot back to the normal position whilst leaving the rudder inclined in the suitable position. The rudder bar is moreover provided with foot-rests 111 which are journalled either on the rudder bar 99 or on members 112 secured at the ends of the rudder bar 99.

This simple arrangement avoids the torsion of the feet which is actually caused by every angular displacement of the rudder bar.

These forms of construction are only simple examples and is obvious that modifications which do not alter in any way the main feature above set forth may be made in the various possible forms of construction without departing thereby from the scope of the invention.

What I claim as my invention and desire to secure by Letters Patent is:

1. In a device for the foot control of the rudder of an airplane, a first rudder bar connected to the rudder levers, a second rudder bar controlled by the pilot's feet, means for angularly connecting these two rudder bars but allowing a relative angular displacement of one of the said rudder bars relatively to the other, for allowing the rudder bar controlled by the pilot to be brought back to its normal position when the rudder is permanently inclined, when compensating, by the said rudder, the stoppage of a side engine of the said airplane.

2. In a device for the foot control of the rudder of an airplane, a first rudder bar connected to the rudder levers and having an axial sleeve, a second rudder bar controlled by the pilot's feet and having another axial sleeve, a vertical shaft for receiving the said sleeves, means for rendering the sleeve of the second rudder bar rigid with the said shaft, a first shaft provided with a tapped head and rigid with the sleeve belonging to the first rudder bar, a second shaft provided with a tapped head and rigid with the sleeve belonging to the second rudder bar, a screw provided with an operating knob and fitting in the tapped portions of the said heads for connecting the said rudder bars and allowing the angular adjustment of the rudder bars relatively to each other.

3. In a device for the foot control of the rudder of an airplane, a first rudder bar connected to the rudder levers, a second rudder bar controlled by the pilot's feet, means for angularly connecting these two rudder bars but allowing a relative angular displacement of one of the said rudder bars relatively to the other, for allowing the rudder bar controlled by the pilot to be brought back to its normal position when the rudder is permanently inclined when compensating, by the said rudder, the stoppage of a side engine of the said airplane, foot-rests for the pilot's feet, the said foot rests being journalled independently from each other about rods mounted at the ends of the rudder bar controlled by the pilot.

In testimony whereof I have signed this specification.

RENÉ ALEXANDRE ARTHUR COUZINET.